(12) United States Patent
Shinohara

(10) Patent No.: US 9,243,108 B2
(45) Date of Patent: Jan. 26, 2016

(54) METHOD OF PRODUCTION OF CROSS-LINKED RUBBER

(71) Applicant: ZEON CORPORATION, Tokyo (JP)

(72) Inventor: Masanobu Shinohara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/389,134

(22) PCT Filed: Mar. 25, 2013

(86) PCT No.: PCT/JP2013/058518
§ 371 (c)(1),
(2) Date: Sep. 29, 2014

(87) PCT Pub. No.: WO2013/146648
PCT Pub. Date: Oct. 3, 2013

(65) Prior Publication Data
US 2015/0073098 A1    Mar. 12, 2015

(30) Foreign Application Priority Data

Mar. 27, 2012    (JP) .................... 2012-071032

(51) Int. Cl.
| | |
|---|---|
| *C08F 283/06* | (2006.01) |
| *C08G 65/334* | (2006.01) |
| *C08J 3/24* | (2006.01) |
| *C08L 71/03* | (2006.01) |
| *C08K 5/00* | (2006.01) |
| *C08G 65/32* | (2006.01) |

(52) U.S. Cl.
CPC ............. *C08G 65/3348* (2013.01); *C08J 3/24* (2013.01); *C08K 5/0025* (2013.01); *C08L 71/03* (2013.01)

(58) Field of Classification Search
CPC ............................. C08F 283/06; C08L 71/02
USPC ............ 525/404; 524/262, 263, 264; 528/370
See application file for complete search history.

(56) References Cited

U.S. PATENT DOCUMENTS

| | | | |
|---|---|---|---|
| 2004/0162368 A1 | 8/2004 | Endo et al. | |
| 2007/0155868 A1 | 7/2007 | Endo et al. | |
| 2008/0227977 A1 | 9/2008 | Endo | |
| 2010/0036062 A1* | 2/2010 | Okawa | 525/474 |
| 2012/0296049 A1 | 11/2012 | Yonemaru et al. | |
| 2013/0214209 A1 | 8/2013 | Hayano et al. | |

FOREIGN PATENT DOCUMENTS

| | | |
|---|---|---|
| JP | A-2004-035868 | 2/2004 |
| WO | WO 02/098866 A1 | 12/2002 |
| WO | WO 2011/081152 A1 | 7/2011 |
| WO | WO 2012/057299 A1 | 5/2012 |

OTHER PUBLICATIONS

Jun. 18, 2013 International Search Report issued in International Application No. PCT/JP2013/058518.

* cited by examiner

*Primary Examiner* — Terressa Boykin
(74) *Attorney, Agent, or Firm* — Oliff PLC

(57) ABSTRACT

A method of producing cross-linked rubber including a step of reacting a polyether rubber composition at 130 to 200° C., the polyether rubber composition containing 100 parts by weight of epihalohydrin monomer units, 0.1 to 100 parts by weight of a five-membered ring or six-membered ring nitrogen atom-containing aromatic heterocyclic type compound, and 0.1 to 10 parts by weight of at least one cross-linking agent which is selected from sulfur, a sulfur-containing compound, and triazine-based compound.

8 Claims, No Drawings

METHOD OF PRODUCTION OF CROSS-LINKED RUBBER

TECHNICAL FIELD

The present invention relates to a method of production of cross-linked rubber, more particularly relates to a method of production of cross-linked rubber with little variation in electrical resistance value, low electrical resistance value, suppressed increase in electrical resistance value even in the case of continuous use, and excellent compression set resistance.

BACKGROUND ART

In a device of an image forming apparatus such as a printer, an electrophotographic copying machine, or a facsimile machine which is believed to require semi-conductivity, a conductive member such as a conductive roll, a conductive blade, or a conductive belt is used.

Depending on specific use, various properties including conductivity within a desired range (electrical resistance value and its variation, dependence on environment, and dependence on voltage), non-contaminating property, low hardness, and dimension stability are required for the conductive member.

As a way of providing conductivity to rubber for constituting part of a conductive member, a method of adding a small amount of a conductivity imparting material such as carbon black or metal oxide to rubber and dispersing it therein to control the electrical resistance of a conductive member is known. However, according to this method, it is difficult to control the dispersity of a small amount of the conductivity imparting material added by kneading and, since the dispersion state of the conductivity imparting material is changed according to flow of rubber during molding and cross-linking, causing a variation in electrical resistance value, and therefore there is a problem that a sharp image is difficult to be obtained.

Therefore, as a solution for the variation in electrical resistance value, polyether rubber or the like having semi-conductivity by itself without being added with a conductivity imparting material has been used as a conductive member. However, in recent days, high speed is required for an image forming apparatus, and the conductive member, in particular a conductive roll, requires to have even lower electrical resistance. As a method of lowering electrical resistance, increasing the unit amount of an ethylene oxide monomer as one of the constituent units of polyether rubber is effective. However, when the unit amount of an ethylene oxide monomer is increased, the rubber itself becomes water soluble, and therefore it may be difficult to produce it. Further, there is also a problem that it causes contamination of a photoconductor. Therefore, according to conventional methods, the unit amount of an ethylene oxide monomer in polyether rubber can be increased only to a certain level, and as a result, requirements for having low electrical resistance may not be fully satisfied.

Further, there has been conventionally a problem that, under application of voltage to a conductive member, upon continuous use, the conductive member deteriorated due to electric current so that electrical resistance value of the conductive member increases and quality of an image is impaired accordingly. For solving this problem, for example, Patent Document 1 discloses polyether rubber which contains 0.1 mol % to less than 30 mol % of units of monomer which has onium ion introduced by using an aliphatic amine such as n-butyldimethylamine, and trimethylamine, as an onium-forming agent. However, the cross-linked rubber which is obtained by using the polyether rubber which is described in this Patent Document 1 has little variation in electrical resistance value, has low electrical resistance value, and is suppressed in increase in electrical resistance value even in the case of continuous use, but is insufficient in compression set resistance. For this reason, improvement of compression set resistance has been desired.

PRIOR ART DOCUMENTS

Patent Documents

Patent Document 1: WO2011/081152

SUMMARY OF THE INVENTION

Problem to be Solved by the Invention

The present invention was made in consideration of this situation and has as its object the provision of a method for producing cross-linked rubber with little variation in electrical resistance value, low electrical resistance value, suppressed increase in electrical resistance value even in the case of continuous use, and excellent compression set resistance.

Means for Solving the Problems

The inventors engaged in intensive research for achieving the object and as a result discovered that by reacting a polyether rubber which contains epihalohydrin monomer units, a five-membered ring or six-membered ring nitrogen atom-containing aromatic heterocyclic type compound, and a specific cross-linking agent 0.1 to 10 parts by weight at 130 to 200° C., cross-linked rubber with little variation in electrical resistance value, low electrical resistance value, suppressed increase in electrical resistance value even in the case of continuous use, and excellent compression set resistance is obtained and thereby completed the present invention.

That is, according to the present invention, there is provided a method of production of cross-linked rubber comprising the step of reacting a polyether rubber composition which contains polyether rubber which contains epihalohydrin monomer units in 100 parts by weight, a five-membered ring or six-membered ring nitrogen atom-containing aromatic heterocyclic type compound 0.1 to 100 parts by weight, and at least one cross-linking agent which is selected from sulfur, a sulfur-containing compound, and triazine-based compound 0.1 to 10 parts by weight at 130 to 200° C.

Preferably, the polyether rubber composition is obtained by kneading the polyether rubber, the nitrogen atom-containing aromatic heterocyclic type compound, and the cross-linking agent at 0 to 100° C.

Preferably, the polyether rubber further contains unsaturated oxide monomer units.

Preferably, the nitrogen atom-containing aromatic heterocyclic type compound is 1-methylimidazole.

Preferably, the polyether rubber composition is heated at 130 to 200° C. to make the cross-linking of the polyether rubber and the reaction for bonding the nitrogen atom-containing aromatic heterocyclic type compound to the side chains of the polyether rubber in a cationized state proceed simultaneously.

Further, according to the present invention, there is provided a cross-linked rubber which is obtained by any of the above methods of production.

Furthermore, according to the present invention, there is provided an electroconductive member which contains the cross-linked rubber.

Effects of the Invention

According to the present invention, it is possible to provide cross-linked rubber with little variation in electrical resistance value, low electrical resistance value, suppressed increase in electrical resistance value even in the case of continuous use, and excellent compression set resistance.

DESCRIPTION OF EMBODIMENTS

The method of production of cross-linked rubber of the present invention comprises the step of reacting a polyether rubber composition which contains polyether rubber which contains epihalohydrin monomer units 100 parts by weight, a five-membered ring or six-membered ring nitrogen atom-containing aromatic heterocyclic type compound 0.1 to 100 parts by weight, and at least one cross-linking agent which is selected from sulfur, a sulfur-containing compound, and triazine-based compound 0.1 to 10 parts by weight at 130 to 200° C.

Below, first, the ingredients which form the polyether rubber composition used in the present invention will be explained.

<Polyether Rubber which Contains Epihalohydrin Monomer Units>

The polyether rubber which contains epihalohydrin monomer units used in the present invention (below, abbreviated as "polyether rubber") is rubber which has epihalohydrin monomer units as essential component units. It may be one which is obtained by polymerizing only an epihalohydrin monomer or may be one which is obtained by copolymerizing an epihalohydrin monomer and other monomers which can copolymerize with the same.

The epihalohydrin monomer which forms the epihalohydrin monomer units is not particularly limited, but for example, epichlorohydrin, epibromohydrin, epiiodohydrin, epifluorohydrin, etc. may be mentioned. Among these as well, epichlorohydrin is preferable. The epihalohydrin monomer may be used as single type alone or may be used as two or more types together.

The ratio of content of the epihalohydrin monomer units in the polyether rubber used in the present invention is preferably, in the total monomer units, 0.1 to 100 mol %, more preferably 10 to 79 mol %, particularly preferably 15 to 58 mol %. If the ratio of content of the epihalohydrin monomer units is in that range, the obtained cross-linked rubber is kept from rising in electrical resistance value even in the case of continuous use. On the other hand, if the ratio of content of the epihalohydrin monomer units is too small, the cross-linking becomes insufficient and the obtained cross-linked rubber sometimes becomes difficult to maintain in shape.

The polyether rubber used in the present invention preferably further contains, in addition to the epihalohydrin monomer units, unsaturated oxide monomer units. The unsaturated oxide monomer which forms the unsaturated oxide monomer units is not particularly limited so long as a compound which contains at least one carbon-carbon unsaturated bond (except carbon-carbon bond of aromatic ring) and at least one epoxy group in its molecule, but, for example, alkenylglycidyl ethers such as an allylglycidyl ether, and butenylglycidyl ether; alkenylepoxides such as a 3,4-epoxy-1-butene, 1,2-epoxy-5-hexene, and 1,2-epoxy-9-decene; etc. may be mentioned. Among these as well, alkenylglycidyl ethers are preferable, while an allylglycidyl ether is more preferable. The unsaturated oxide monomer may be used as single type alone or may be used as two or more types together.

The ratio of content of the unsaturated oxide monomer units in the polyether rubber used in the present invention is preferably, in the total monomer units, 0 to 15 mol %, more preferably 1 to 12 mol %, particularly preferably 2 to 10 mol %. If the ratio of content of the unsaturated oxide monomer units is in that range, the polyether rubber can be made one better in cross-linkability. On the other hand, if the ratio of content of the unsaturated oxide monomer units is too small, the obtained cross-linked rubber sometimes deteriorates in compression set. Further, if the ratio of content of the unsaturated oxide monomer units is too large, during the polymerization reaction, a gelation reaction (3D cross-linking reaction) etc. easily occur in the polymer molecule or between the polymer molecules and the shapability is liable to fall.

Further, the polyether rubber used in the present invention, from the viewpoint of low electrical resistance, preferably further contains, in addition to the epihalohydrin monomer units and unsaturated oxide monomer units, ethylene oxide monomer units. The ethylene oxide monomer units are units which are formed by an ethylene oxide monomer. The ratio of content of the ethylene oxide monomer units, in the polyether rubber used in the present invention is preferably, in the total monomer units, 0 to 90 mol %, more preferably 20 to 80 mol %, particularly preferably 40 to 75 mol %. If the ratio of content of the ethylene oxide monomer units is in that range, the obtained cross-linked rubber is excellent in low electrical resistance. On the other hand, if the ratio of content of the ethylene oxide monomer units is too small, the effect of reduction of electrical resistance value of the obtained cross-linked rubber becomes harder to obtain. Further, if the ratio of content of the ethylene oxide monomer units is too large, production of the polyether rubber is liable to become difficult.

Furthermore, the polyether rubber used in the present invention may contain, in addition to epihalohydrin monomer units, unsaturated oxide monomer units, and ethylene oxide monomer units, other monomer units which can copolymerize with the same. As the other monomer units, for example, alkylene oxide monomer units excluding ethylene oxide may be preferably mentioned. The alkylene oxide monomer which forms alkylene oxide monomer units excluding ethylene oxide is not particularly limited, but, for example, linear or branched alkylene oxide such as propylene oxide, 1,2-epoxybutane, 1,2-epoxy-4-chloropentane, 1,2-epoxyhexane, 1,2-epoxyoctane, 1,2-epoxydecane, 1,2-epoxyoctadecane, 1,2-epoxyeicosan, 1,2-epoxyisobutane, and 2,3-epoxyisobutane; cyclic alkylene oxide such as 1,2-epoxycycloropentane, 1,2-epoxycyclohexane, and 1,2-epoxycyclododecane; glycidyl ether having a linear or branched alkyl such as butyl glycidyl ether, 2-ethylhexyl glycidyl ether, 2-methyloctyl glycidyl ether, neopentyl glycol diglycidyl ether, decyl glycidyl ether, and stearyl glycidyl ether; glycidyl ether having an oxyethylene side chain such as ethylene glycol diglycidyl ether, diethylene glycol diglycidyl ether, and polyethylene glycol diglycidyl ether; etc. may be mentioned. Among these as well, linear alkylene oxide is preferable, while propylene oxide is more preferable. These alkylene oxide monomer excluding ethylene oxide may be used alone as single types or may be jointly used as two types or more.

The ratio of content of alkylene oxide monomer units excluding ethylene oxide in the polyether rubber used in the present invention is preferably, in the total monomer units, 30 mol % or less, more preferably 20 mol % or less, furthermore preferably 10 mol % or less. If the ratio of content of the alkylene oxide monomer units excluding ethylene oxide is too large, the obtained cross-linked rubber is liable to increase in volume resistivity value.

Further, the other copolymerizable monomer other than alkylene oxide monomer is not particularly limited, but, for example, aryl epoxides such as a styrene oxide, and phenylglycidyl ether; etc. may be mentioned. The ratio of content of other copolymerizable monomer units other than alkylene oxide monomer in the polyether rubber used in the present invention is preferably, in the total monomer units, 20 mol % or less, more preferably 10 mol % or less, furthermore preferably 5 mol % or less.

The polyether rubber used in the present invention can be obtained by ring-opening polymerization of each monomer described above by the solution polymerization method or solvent slurry polymerization method, etc.

The polymerization catalyst used for polymerization is not specifically limited if it is a catalyst generally used for polyether polymerization. As the polymerization catalyst, for example, a catalyst obtained by reacting organic aluminum with water and acetyl acetone (Japanese Patent Publication No. 35-15797); a catalyst obtained by reacting triisobutyl aluminum with phosphoric acid and triethylamine (Japanese Patent Publication No. 46-27534); a catalyst obtained by reacting triisobutyl aluminum with an organic acid salt of diazabicycloundecene and phosphoric acid (Japanese Patent Publication No. 56-51171); a catalyst consisting of a partial hydrolyzate of aluminum alkoxide and an organo zinc compound (Japanese Patent Publication No. 43-2945); a catalyst consisting of an organo zinc compound and polyvalent alcohol (Japanese Patent Publication No. 45-7751); a catalyst consisting of dialkyl zinc and water (Japanese Patent Publication No. 36-3394); and a catalyst consisting of tributyl tin chloride and tributyl phosphate (Japanese Patent No. 3223978) etc. may be mentioned.

As the solvent for polymerization is not specifically limited if it is inert, for example, aromatic hydrocarbons such as benzene and toluene; saturated linear hydrocarbons such as n-pentane and n-hexane; and, saturated cyclic hydrocarbons such as cyclopentane and cyclohexane etc. may be used. Of these, when ring-opening polymerization is carried out based on solution polymerization, aromatic hydrocarbons are preferably used from the view point of solubility of the obtained polyether rubber. Toluene is more preferable.

The polymerization reaction temperature is preferably 20 to 150° C., while 50 to 130° C. is more preferable. The polymerization can be carried out according to any mode including a batch type, a semi-batch type, and a continuous type.

The polyether rubber used in the present invention may be a copolymerization type of either block copolymerization and random copolymerization. In particular, when using ethylene oxide as the monomer, a random copolymer is preferable since the crystallinity of the polyethylene oxide is reduced and the rubber elasticity is hard to impair.

The method of recovering the polyether rubber which is obtained by the polymerization reaction from the solvent is not particularly limited, but, for example, the methods of coagulation, filtration, dehydration and drying be suitably combined. As the method for coagulating the polyether rubber from the solution in which the polyether rubber is dissolved, for example, it is possible to use a common method such as steam stripping or a method of precipitation using a poor solvent, etc. Further, as the method of filtering the polyether rubber from a slurry containing the polyether rubber, in accordance with need, for example, the method using a screen such as rotating screen, and vibrating screen may be mentioned. Furthermore, as the method of dehydrating the polyether rubber, for example, the method of dehydrating using a centrifugal dehydrator; rolls, Bambury type dehydrator, screw extruder type dehydrator, or other press dehydrator; etc. may be mentioned. Furthermore, as the method of drying the polyether rubber, for example, the method using a dryer such as kneader type dryer, expander dryer, hot air dryer, and vacuum dryer; may be mentioned. These above-mentioned methods and the equipment used etc. may be used respectively alone or as two or more types combined.

The polyether rubber used in the present invention has a weight average molecular weight of preferably 200,000 to 2,000,000, more preferably 400,000 to 1,500,000. If the weight average molecular weight is too high, the Mooney viscosity becomes higher and the shaping is liable to become difficult. On the other hand, if the weight average molecular weight is too low, the obtained cross-linked rubber is liable to deteriorate in compression set.

The polyether rubber used in the present invention has a Mooney viscosity (polymer Mooney viscosity $ML_{1+4}$, 100° C.) of preferably 10 to 120, more preferably 30 to 90. If the Mooney viscosity is too high, the shapeability becomes inferior and, when used for a conductive member application, formation of a conductive member becomes difficult. Furthermore, swell (that is, diameter of an extruded article is larger than the diameter of a die during extrusion molding) is liable to occur and the dimensional stability to fall. On the other hand, if the Mooney viscosity is too low, the obtained cross-linked rubber is liable to drop in mechanical strength.

<Five-Membered Ring or Six-Membered Ring Nitrogen Atom-Containing Aromatic Heterocyclic Type Compound>

The five-membered ring or six-membered ring nitrogen atom-containing aromatic heterocyclic type compound used in the present invention (below, abbreviated as "nitrogen atom-containing aromatic heterocyclic type compound") is not particularly limited so long as it has a five-membered ring structure or six-membered ring structure, contains a nitrogen atom in the ring structure, and has an aromatic property. However, for example, benzoimidazole or other condensed heterocyclic type compound is excluded.

The nitrogen atom-containing aromatic heterocyclic type compound used in the present invention may, for example, be one which has a plurality of nitrogen atoms in a hetero ring or one which has an oxygen atom, sulfur atom, or other hetero atom other than a nitrogen atom in a hetero ring. Furthermore, part of the atoms which form the hetero ring may be substituted by a substituent. As the structure of the nitrogen-containing aromatic hetero ring which forms such a nitrogen atom-containing aromatic heterocyclic type compound, for example, a five-membered hetero ring such as imidazole ring, pyrrole ring, thiazole ring, oxazole ring, pyrazole ring, and isoxazole ring; a six-membered hetero ring such as pyridine ring, pyrazine ring, pyrimidine ring, pyridazine ring, and triazine ring; etc. may be mentioned. Among these as well, a five-membered hetero ring is preferable, while an imidazole ring is more preferable.

Further, the substituent of the nitrogen-containing aromatic hetero ring is not particularly limited, but, for example, an alkyl group; cycloalkyl group; alkenyl group; aryl group; arylalkyl group; alkylaryl group; alkoxyl group; alkoxyalkyl group; aryloxy group; alkanol group; hydroxyl group; carbonyl group; alkoxycarbonyl group; amino group; imino group; nitrile group; alkylsilyl group; halogen atom; etc. may be mentioned.

As specific examples of such a nitrogen atom-containing aromatic heterocyclic type compound, five-membered heterocyclic type compound such as imidazole, 1-methylimidazole, pyrrole, 1-methylpyrrole, thiazole, oxazole, pyrazole and isoxazole; six-membered heterocyclic type compound such as pyridine, pyrazine, pyrimidine, pyridazine, triazine and 2,6-lutidine; etc. may be mentioned. Among these as well, a five-membered heterocyclic type compound is preferable. From the viewpoint of the high effect of reducing the volume resistivity value of the obtained cross-linked rubber, 1-methylimidazole is more preferable.

The amount of the nitrogen atom-containing aromatic heterocyclic type compound in the polyether rubber composition used in the present invention is 0.1 to 100 parts by weight with respect to 100 parts by weight of the polyether rubber, preferably 0.2 to 50 parts by weight, more preferably 0.3 to 20 parts by weight. If the amount of the nitrogen atom-containing aromatic heterocyclic type compound is in that range, the obtained cross-linked rubber is low in electrical resistance value. Even if continuously used, the increase in electrical resistance value is suppressed and the compression set resistance becomes excellent. On the other hand, if the amount of the nitrogen atom-containing aromatic heterocyclic type compound is too small, the obtained cross-linked rubber becomes higher in volume resistivity value and, when continuously supplying voltage, the electrical resistance value sometimes increases. Further, if the amount is too large, the obtained cross-linked rubber becomes hard and the property as a rubbery elastic member is sometimes lost. These nitrogen atom-containing aromatic heterocyclic type compounds may be used as single types alone or may be used as two types or more combined.

<Cross-Linking Agent>

Further, the polyether rubber composition used in the present invention contains at least one cross-linking agent which is selected from sulfur, a sulfur-containing compound, and a triazine-based compound. By using these cross-linking agents, it is possible to make the cross-linking of the polyether rubber sufficiently proceed.

As the sulfur which is used as the cross-linking agent used in the present invention, for example, powdered sulfur, precipitated sulfur, colloidal sulfur, insoluble sulfur, highly dispersed sulfur, etc. may be mentioned.

Further, as the sulfur-containing compound, for example, sulfur monochloride, sulfur dichloride, 4,4'-dithiodimorpholine, alkylphenoldisulfide, 6-methylquinoxaline-2,3-dithiocarbonate, N,N'-dithio-bis(hexahydro-2H-azenopine-2), phosphorus-containing polysulfide, high molecular weight polymer sulfides, etc. may be mentioned.

Furthermore, as the triazine-based compound, for example, 2,4,6-trimercapto-1,3,5-triazine etc. may be mentioned.

These cross-linking agents may be used as single types alone or may be used as two types or more combined.

The amount of the cross-linking agent in the polyether rubber composition used in the present invention is 0.1 to 10 parts by weight with respect to 100 parts by weight of the polyether rubber, preferably 0.2 to 7 parts by weight, more preferably 0.3 to 5 parts by weight. If the amount of the cross-linking agent is in that range, the cross-linking of the polyether rubber can be made to sufficiently proceed. On the other hand, if the amount of the cross-linking agent is too small, the cross-linking speed becomes slower, the obtained cross-linked rubber falls in productivity, and the polishability when polishing the cross-linked rubber for use is liable to fall. Further, if the amount of the cross-linking agent is too large, the obtained cross-linked rubber becomes higher in hardness and the cross-linking agent may bloom.

Further, when sulfur or a sulfur-containing compound is used as a cross-linking agent, it is preferable to use a cross-linking acceleration aid and a cross-linking accelerator in combination. As the cross-linking acceleration aid, although not specifically limited, for example, zinc oxide and stearic acid etc. may be mentioned. As the cross-linking accelerator, for example, although not specifically limited, guanidine-based compound; aldehyde/amine based compound; aldehyde/ammonia-based compound; thiazole-based compound; sulfenamide based compound; thiourea-based compound; thiuram-based compound; and dithiocarbmaic acid salt-based compound; etc. may be mentioned. The cross-linking acceleration aids and cross-linking accelerators may be each used alone or in combination of two or more types.

The amounts of each use of the cross-linking acceleration aid and cross-linking accelerator are not particularly limited, but are preferably 0.01 to 15 parts by weight, more preferably 0.1 to 10 parts by weight, with respect to 100 parts by weight of the polyether rubber. If the amounts of use of the cross-linking acceleration aid and cross-linking accelerator are too great, the cross-linking rate is liable to become too fast and a bloom is liable to form on the surface of the obtained cross-linked rubber. On the other hand, if too small, the cross-linking rate becomes slow and the productivity inferior, the cross-linking does not sufficiently proceed, and the obtained cross-linked rubbers are liable to become inferior in mechanical properties.

Furthermore, the polyether rubber composition used in the present invention may further contain a filler.

The filler is not particularly limited, but, for example, carbon black, silica, etc. may be mentioned. These fillers may be used alone or as two types or more combined. The ratio of the filler in the polyether rubber composition used in the present invention is not particularly limited, but is preferably 0.1 to 20 parts by weight with respect to 100 parts by weight polyether rubber, more preferably 1 to 20 parts by weight. If the amount of filler is in that range, the effect of reinforcement of the obtained cross-linked rubber becomes easy to obtain.

Further, the polyether rubber composition used in the present invention may further contain, within the range that the effect of the present invention is not impaired, diene-based rubber such as butadiene rubber, styrene butadiene rubber, chloroprene rubber, isoprene rubber, natural rubber, acrylonitrile butadiene rubber, butyl rubber, or partially hydrogenated product of those rubbers (for example, hydrogenated nitrile rubber); rubber other than the diene-based rubber such as ethylene propylene rubber, acrylic rubber, polyether rubber (excluding the polyether rubber of the present invention), fluoro rubber, or silicone rubber; thermoplastic elastomer such as olefin-based thermoplastic elastomer, styrene-based thermoplastic elastomer, vinyl chloride-based thermoplastic elastomer, polyester-based thermoplastic elastomer, polyamide-based thermoplastic elastomer, or polyurethane-based thermoplastic elastomer; and a resin such as polyvinyl chloride, a cumarone resin, or a phenol resin. The rubber, thermoplastic elastomer, and resin may be used either singly or in combination of two or more. Total amount of them is preferably 100 parts by weight or less, more preferably 50 parts by weight or less, and furthermore preferably 20 parts by weight or less with respect to 100 parts by weight of the polyether rubber.

Furthermore, the polyether rubber composition used in the present invention may contain, in addition to the above-mentioned additives, other additives which are usually blended into known rubber. Such an additive is not particularly limited, but for example, an acid acceptor; reinforcing agent; antioxidant; UV absorbing agent; light stabilizer; tackifier;

surfactant; conductivity imparting material; electrolyte material; colorant (dye and pigment); flame retardant; anti-static agent; etc. may be mentioned.

The polyether rubber composition used in the present invention can be prepared by blending and kneading, into the polyether rubber, a nitrogen atom-containing aromatic heterocyclic type compound and cross-linking agent and various additives which are used in accordance with need by a desired method. Note that, when kneading the each ingredient, kneading at a temperature where later-explained cationization of the side chains of the polyether rubber does not occur and a temperature where cross-linking by a cross-linking agent does not occur is preferable, specifically kneading at 0 to 100° C. is preferable, while kneading at 10 to 90° C. is more preferable. The kneading time is preferably 30 seconds to 30 minutes. Further, at the time of blending and kneading, for example, a kneader, Bambury mixer, open roll, calendar roll, extruder, or any other kneading and shaping machine may be used. These may be used in a combination of a plurality of types.

<Method of Production of Cross-Linked Rubber>

The cross-linked rubber obtained by the method of production of the present invention is produced by making the above-mentioned polyether rubber composition react at 130 to 200° C.

In the present invention, by heating the above-mentioned polyether rubber composition at 130 to 200° C., it is possible to make the cross-linking of the polyether rubber proceed while making a reaction proceed where at least part of the nitrogen atom-containing aromatic heterocyclic type compound which is contained in the polyether rubber composition bonds with the side chains of the polyether rubber in the cationized state. Further, due to this, it is possible to introduce, in the cross-linked polyether rubber which forms the obtained cross-linked rubber, the units shown by the following general formula (1).

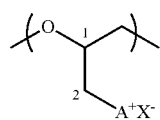

(1)

In the general formula (1), $A^+$ is a group which contains a cationic nitrogen-containing aromatic hetero ring derived from a nitrogen atom-containing aromatic heterocyclic type compound. The cationic nitrogen-containing aromatic hetero ring is bonded with the carbon atom at the "2" position which is shown in the general formula (1) through one of the nitrogen atoms which form the hetero ring. Further, $X^-$ is arbitrary counter anion.

Note that, the nitrogen atom-containing aromatic heterocyclic type compound normally is bonded with the side chains of polyether rubber in the cationized state by substituting at least part of the halogen atoms which form the epihalohydrin monomer units which are contained in the polyether rubber.

In the present invention, as the group which contains a cationic nitrogen-containing aromatic hetero ring shown by $A^+$ in the general formula (1), a group shown by the following general formula (2) is preferable.

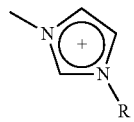

(2)

In the above general formula (1), the N— which is shown in the above general formula (2) is bonded with the carbon atom at the "2" position which is shown in the above general formula (1). Further, the R which is shown in the above general formula (2) indicates a hydrogen atom or a $C_1$ to $C_{20}$ hydrocarbon group.

The R which is shown in the above general formula (2) is preferably a $C_1$ to $C_{20}$ alkyl group, more preferably a methyl group.

In particular, according to the present invention, at least part of the nitrogen atom-containing aromatic heterocyclic type compound is bonded with the side chains of the polyether rubber in the cationized state, whereby the obtained cross-linked rubber can be made one with a low electrical resistance value, suppressed increase in electrical resistance value even in the case of continuous use, and excellent compression set resistance. In addition, according to the present invention, by making the cross-linking of the polyether rubber and the reaction bonding the nitrogen atom-containing aromatic heterocyclic type compound to the side chains of the polyether rubber in a cationized state proceed simultaneously, it is possible to perform these reactions in a simpler way and shorter time compared with the case of performing the cross-linking of the polyether rubber and such a reaction separately.

In the present invention, the heating temperature when causing a reaction of the above-mentioned polyether rubber composition is 130 to 200° C., preferably 140 to 190° C., more preferably 150 to 180° C. If the heating temperature is too low, the cross-linking of the polyether rubber composition and cationization of the side chains of the polyether rubber end up becoming insufficient, the obtained cross-linked rubber increases in volume resistivity value, and the cross-linked rubber becomes difficult to maintain in shape. On the other hand, if the heating temperature is too high, the polyether rubber is liable to break down and the nitrogen atom-containing aromatic heterocyclic type compound is liable to volatize.

Further, the heating time is not particularly limited, but is preferably 1 minute to 6 hours, more preferably 5 minutes to 3 hours, furthermore preferably 10 minutes to 1 hour. As the heating method, press heating, oven heating, steam heating, hot air heating, microwave heating, etc. may be suitably selected. Furthermore, in accordance with need, secondary cross-linking may be carried out by an ordinary method.

Note that, in the general formula (1), the arbitrary counter anion shown by $X^-$ is a compound or atom which has a negative charge which is bonded with $A^+$ by an ion bond. Aside from having a negative charge, it is not particularly limited, but usually it is a halide ion derived from the halogen atoms which form the epihalohydrin monomer units which are contained in the polyether rubber, preferably a chloride ion. Further, in the present invention, at least part of the counter anions may be exchanged with arbitrary counter anions by a known ion exchange reaction.

Further, in the cross-linked polyether rubber which forms the cross-linked rubber which is obtained by the method of production of the present invention, the ratio of content of the units which are shown by the general formula (1) is preferably 0.1 to 30 mol %, more preferably 0.3 to 25 mol %, furthermore preferably 0.5 to 12 mol %. If the ratio of content of the units which are shown by the general formula (1) is in that range, the obtained cross-linked rubber can be made one with a small compression set rate, a low electrical resistance value, and the ability to keep down the increase in the volume resistivity value upon energization. On the other hand, if the ratio of content of the units which are shown by the general formula (1) is too small, the obtained cross-linked rubber becomes high in volume resistivity value and the electrical resistance value sometimes increases when continuously applying voltage. Further, if the ratio of content of the units which are shown by the general formula (1) is too large, the obtained cross-linked rubber becomes hard and the property as a rubbery elastic member is sometimes lost. Further, in the cross-linked rubber which is obtained by the method of production of the present invention, preferably 0.1 to 100 wt %, more preferably 1 to 100 wt %, of the nitrogen atom-containing aromatic heterocyclic type compound which is blended into the polyether rubber composition before reaction is preferably bonded with the side chains of the polyether rubber in the cationized state.

To determine the content ratio of units which are shown by the general formula (1) (below, also referred to as the "content ratio of onium ion units") in the cross-linked polyether rubber which forms the cross-linked rubber which is obtained by the method of production of the present invention, a known method may be used. For example, as the method of simply and quantitatively finding the content ratio of onium ion units, the method of measuring the cross-linked rubber of the present invention by $^{13}C$-NMR to quantify the content of the groups which contain cationic nitrogen-containing aromatic hetero rings derived from a nitrogen atom-containing aromatic heterocyclic type compound may be mentioned. Specifically, first, the number of moles B1 of all monomer units in the polymer (including onium ion units) is calculated from the integrated value of the peaks which are derived from the polyether chains of the main chains of the cross-linked polyether rubber which forms the cross-linked rubber which is obtained by the method of production of the present invention. Next, the number of moles B2 of the onium ion units (units shown by the general formula (1)) which are introduced is calculated from the integrated value of the peaks which are derived from groups which contain cationic nitrogen-containing aromatic hetero rings. Further, by dividing the number of moles B2 of the units shown by the general formula (1) which are introduced by the number of moles B1 of all monomer units in the polymer (including onium ion units), it is possible to calculate the content ratio of the onium ion units by the following formula (3).

Content ratio of onium ion units (mol %)=100×$B2/B1$ (3)

The volume resistivity value of the cross-linked rubber which is obtained by the method of production of the present invention is usually $1\times10^{5.0}$ to $1\times10^{9.5}$ Ω·cm, preferably $1\times10^{5.2}$ to $1\times10^{8.0}$ Ω·cm, more preferably $1\times10^{5.5}$ to $1\times10^{7.5}$ Ω·cm, in terms of the value after 30 seconds from the start of application of voltage in the case of making the applied voltage 1000V in a measurement environment of a temperature of 23° C. and humidity of 50%. If the volume resistivity value of the cross-linked rubber is within the range, a conductive member which is excellent in low electrical resistance property is obtained. On the other hand, if the volume resistivity value of the cross-linked rubber is too high, higher voltage should be applied to obtain the same amount of electric current, causing increased power consumption, and therefore it is undesirable for a conductive member. Further, if the volume resistivity value of the cross-linked rubber is too low, electric current may flow in an undesired direction other than the direction applied with voltage, and when used as a conductive member, the function as a conductive member may be impaired.

An increase value in volume resistivity value of the cross-linked rubber which is obtained by the method of production of the present invention that is caused by electric current is preferably within the range of 0 to 0.5 in terms of the value obtained by subtracting the $\log_{10}$ (volume resistivity value) obtained 30 seconds after applying voltage from the $\log_{10}$ (volume resistivity value) obtained 10 minutes after applying voltage under the condition for measuring volume resistivity value as described above.

The cross-linked rubber which is obtained by the method of production of the present invention is small in variation of electrical resistance value, low in electrical resistance value, suppressed in increase in electrical resistance value even in the case of continuous use, and excellent in compression set resistance. For this reason, by making use of these properties, this is useful as a material for various types of industrial rubber products. For example, it can be used for a conductive member such as a conductive roll, a conductive blade, or a conductive belt that are used for a copying machine or a printer; a material for a shoe sole or a hose; a material for a belt such as a conveyor belt or a hand-rail of an escalator; a seal, and a packing material; etc. Among these as well, use as a conductive member which is used for a copying machine, printer, etc. is preferable, in particular, suitable use may be made for a conductive roll.

EXAMPLES

Below, examples and comparative examples will be given to explain the present invention more specifically. Note that, in the examples, "parts" and "%" are based on weight unless otherwise indicated.

The content of onium ion units was measured and the various types of physical properties were evaluated based on the following methods.

[Mooney Viscosity]

The Mooney viscosity ($ML_{1+4}$, 100° C.) was measured in accordance with JIS K6300 at 100° C.

[Content of Onium Ion Units]

The content ratio of onium ion units in the examples was measured as follows using a nuclear magnetic resonance apparatus ($^{13}C$-NMR). Specifically, first, the number of moles B1 of all monomer units in the polymer (including onium ion units) was calculated from the integrated value of the peaks which were derived from the polyether chains of the main chains of the cross-linked polyether rubber which formed the cross-linked rubber. Next, the number of moles B2 of the onium ion units (units shown by the general formula (1)) which were introduced was calculated from the integrated value of the peaks which were derived from groups which contained cationic nitrogen-containing aromatic hetero rings. Thereafter, by dividing the number of moles B2 of the onium ion units which were introduced (units shown by the general formula (1)) by the number of moles B1 of all monomer units in the polymer (including onium ion units), content ratio of onium ion unit was calculated by the following formula (3).

Content ratio of onium ion units (mol %)=100×$B2/B1$ (3)

[Volume Resistivity Value (23° C., 50% RH)]

The obtained sheet-shaped cross-linked rubber (vertical 15 cm, horizontal 10 cm, thickness 2 mm) was used to measure the volume resistivity value. The volume resistivity value was measured based on the double ring electrode method of JIS K6271. The measurement conditions were made a temperature of 23° C., a humidity of 50%, and an applied voltage of 1000V. The value after 30 seconds from the start of application of voltage was measured.

[Increase Value in Volume Resistivity Value Caused by Electric Current (23° C., 50% RH)]

The increase value in volume resistivity value that was caused by electric current was obtained by subtracting the $\log_{10}$ (volume resistivity value) obtained 30 seconds after applying voltage from the $\log_{10}$ (volume resistivity value) obtained 10 minutes after applying voltage under the condition for measuring volume resistivity value as described above.

[Compression Set]

The obtained cross-linked rubber (diameter 29 mm, height 12.7 mm columnar shape) was, in accordance with JIS K6262, compressed 25%, allowed to stand in that state in a 70° C. environment for 22 hours, then the compression was released and the compression set was measured. The smaller the compression set in value, the more the rubber elasticity is held and the better the rubber can be judged.

Production Example 1

Production of Polymerization Catalyst

The inside of a hermetically sealed pressure resistant glass container was substituted by nitrogen and supplied with toluene 200 parts and triisobutyl aluminum 60 parts. This glass bottle was immersed in ice water to cool it, then diethyl ether 230 parts was added and stirred in. Next, while cooling by ice water, phosphoric acid 13.6 parts was added and further stirred in. At this time, the reaction between the triisobutyl aluminum and phosphoric acid causes the pressure inside the container to rise, so the pressure was suitably relieved. The obtained reaction mixture was matured in a 60° C. warm water bath for 1 hour to obtain a catalyst solution.

Production Example 2

Production of Polyether Rubber

To an autoclave, epichlorohydrin 223.5 parts, allyl glycidyl ether 27.5 parts, ethylene oxide 19.7 parts, and toluene 2585 parts were added. While stirring in a nitrogen atmosphere, the internal solution was raised in temperature to 50° C. and the above obtained catalyst solution 11.6 parts was added to start the reaction. Next, from the start of the reaction, a solution comprised of ethylene oxide 129.3 parts dissolved in toluene 302 parts was continuously added over 5 hours at an equal speed. Further, every 30 minutes after the start of the reaction, the catalyst solution was added in amounts of 6.2 parts each for addition over 5 hours. Next, water 15 parts was added and stirred in and the reaction was ended. To this, furthermore, an antioxidant comprised of 4,4'-thiobis-(6-tert-butyl-3-methylphenol) in 5% toluene solution 45 parts was added and stirred in. Steam stripping was performed to remove the toluene and remove the supernatant water, then the result was dried in vacuo at 60° C. to obtain the Polyether Rubber 400 parts. The monomer composition ratio of this polyether rubber was measured by $^1$H-NMR and as a result was epichlorohydrin monomer unit 40 mol %, ethylene oxide monomer unit 56 mol %, and allyl glycidyl ether monomer unit 4 mol %. Further, the Mooney viscosity was 60.

Example 1

A 40° C. open roll was charged with the polyether rubber which was obtained in Production Example 2, 100 parts, 1-methylimidazole 1 part, a cross-linking agent constituted by sulfur (Sulfax PMC, made by Tsurumi Chemical) 0.5 part, a filler constituted by carbon black (Seast SO, made by Tokai Carbon) 10 parts, a cross-linking acceleration aid constituted by Zinc White (ZnO #1, made by Seido Chemical Industrial Co., Ltd.) 5 parts, stearic acid 1 part, and a cross-linking accelerator constituted by tetraethylthiuram disulfide (Noccelar TET, made by Ouchi Shinko Chemical Industrial Co., Ltd.) 1 part. The mixture was kneaded for 10 minutes to prepare a polyether rubber composition. Next, the obtained polyether rubber composition was pressed by a 170° C. press forming machine for 20 minutes to obtain cross-linked rubber. Further, the obtained cross-linked rubber was measured in accordance with the above-mentioned method for the content ratio of onium ion units and evaluated for physical properties including the volume resistivity value, increase value in volume resistivity value caused by electric current, and compression set. The results are shown in Table 1.

Example 2

Except for changing the content of 1-methylimidazole from 1 part to 5 parts, the same procedure was followed as in Example 1 to obtain a polyether rubber composition and cross-linked rubber and the same procedure was followed to measure the content ratio of onium ion units and evaluate the various types of physical properties. The results are shown in Table 1.

Example 3

A 40° C. open roll was charged with the polyether rubber which was obtained in Production Example 2, 100 parts, 1-methylimidazole 10 parts, a cross-linking agent constituted by 4,4'-dithiodimorpholine (Valnoc R, made by Ouchi Shinko Chemical Industrial Co., Ltd.) 0.5 part, a filler constituted by carbon black (Seast SO, made by Tokai Carbon) 10 parts, a cross-linking acceleration aid constituted by Zinc White (ZnO #1, made by Seido Chemical Industrial Co., Ltd.) 5 parts, stearic acid 1 part, a cross-linking accelerator constituted by tetraethylthiuram disulfide (Noccelar TET, made by Ouchi Shinko Chemical Industrial Co., Ltd.) 1.5 parts, and dibenzothiazyl disulfide (Noccelar DM, made by Ouchi Shinko Chemical Industrial Co., Ltd.) 1.5 parts. The mixture was kneaded for 10 minutes to prepare a polyether rubber composition. Next, the obtained polyether rubber composition was pressed by a 180° C. press forming machine for 15 minutes to obtain cross-linked rubber. Further, the obtained cross-linked rubber was measured for content ratio of onium ion units and evaluated for various types of physical properties in the same way as Example 1. The results are shown in Table 1.

Example 4

A 40° C. open roll was charged with the polyether rubber which was obtained in Production Example 2, 100 parts, 1-methylimidazole 5 parts, a cross-linking agent constituted by 6-methylquinoxaline-2,3-dithiocarbonate (Daisonet XL-21, made by Daiso) 1.4 parts, a filler constituted by carbon black (Seast SO, made by Tokai Carbon) 10 parts, an acid acceptor constituted by hydrated lime (Cardic #1000, made by Ohmi Chemical Industrial Co., Ltd.) 4 parts, calcium carbonate (Hakuenka CC, made by Shiraishi Kogyo Kaisha) 5 parts, a cross-linking acceleration aid constituted by stearic acid 1 part, and a cross-linking accelerator constituted by pentaerythritol 0.7 part. The mixture was kneaded for 10 minutes to prepare a polyether rubber composition. Next, the obtained polyether rubber composition was pressed by a 160° C. press forming machine for 30 minutes to obtain cross-linked rubber. Further, the obtained cross-linked rubber was measured for content ratio of onium ion units and evaluated for various types of physical properties in the same way as Example 1. The results are shown in Table 1.

Example 5

Except for changing the content of 1-methylimidazole from 5 parts to 10 parts, the same procedure was followed as in Example 4 to obtain a polyether rubber composition and cross-linked rubber and the same procedure was followed to measure the content ratio of onium ion units and evaluate various types of physical properties. The results are shown in Table 1.

Example 6

A 40° C. open roll was charged with the polyether rubber which was obtained in Production Example 2, 100 parts, 1-methylimidazole 5 parts, a cross-linking agent constituted by 2,4,6-trimercapto-1,3,5-triazine 0.9 part, a filler constituted by carbon black (Seast SO, made by Tokai Carbon) 10 parts, an acid acceptor constituted by magnesium oxide (Kyowa Mag 100, made by Kyowa Chemical Industrial Co., Ltd.) 3 parts, calcium carbonate (Hakuenka CC, made by Shiraishi Kogyo Kaisha) 5 parts, and a cross-linking acceleration aid constituted by stearic acid 1 part. The mixture was kneaded for 10 minutes to prepare a polyether rubber composition. Next, the obtained polyether rubber composition was pressed by a 160° C. press forming machine for 20 minutes to obtain cross-linked rubber. Further, the obtained cross-linked rubber was measured for the content ratio of onium ion units and evaluated for various types of physical properties in the same way as Example 1. The results are shown in Table 1.

Example 7

Except for changing the content of 1-methylimidazole from 5 parts to 10 parts, the same procedure was followed as in Example 6 to obtain a polyether rubber composition and cross-linked rubber and the same procedure was followed to measure the content ratio of onium ion units and evaluate various types of physical properties. The results are shown in Table 1.

Comparative Example 1

Except for not blending 1-methylimidazole, the same procedure was followed as in Example 1 to obtain a polyether rubber composition and cross-linked rubber and the same procedure was followed to evaluate the various types of physical properties. The results are shown in Table 1.

Comparative Example 2

Except for not blending 1-methylimidazole, the same procedure was followed as in Example 3 to obtain a polyether rubber composition and cross-linked rubber and the same procedure was followed to evaluate the various types of physical properties. The results are shown in Table 1.

Comparative Example 3

Except for not blending 1-methylimidazole, the same procedure was followed as in Example 4 to obtain a polyether rubber composition and cross-linked rubber and the same procedure was followed to evaluate the various types of physical properties. The results are shown in Table 1.

Comparative Example 4

Except for not blending 1-methyl imidazole, the same procedure was followed as in Example 6 to obtain a polyether rubber composition and cross-linked rubber and the same procedure was followed to evaluate the various types of physical properties. The results are shown in Table 1.

Comparative Example 5

Except for not blending a cross-linking agent constituted by sulfur, a cross-linking acceleration aid constituted by Zinc White, and a cross-linking accelerator constituted by tetraethylthiuram disulfide, the same procedure was followed as in Example 1 to obtain a polyether rubber composition. Further, the obtained polyether rubber composition was used for cross-linking in the same way as Example 1, but the cross-linking reaction did not proceed and a cross-linked product enabling evaluation of various types of physical properties could not be obtained.

Comparative Example 6

Except for not blending a cross-linking agent constituted by sulfur, a cross-linking acceleration aid constituted by Zinc White, and a cross-linking accelerator constituted by tetraethylthiuram disulfide, the same procedure was followed as in Example 2 to obtain a polyether rubber composition. Further, the obtained polyether rubber composition was used for cross-linking in the same way as Example 2, but the cross-linking reaction did not proceed and a cross-linked product enabling evaluation of various types of physical properties could not be obtained.

Comparative Example 7

Except for using, instead of 1-methylimidazole 1 part, 2-mercapto benzoimidazole (Nocrac MB, made by Ouchi Shinko Chemical Industrial Co., Ltd.) 1 part, the same procedure was followed as in Example 1 to obtain a polyether rubber composition and cross-linked rubber and the same procedure was followed to evaluate the various types of physical properties. The results are shown in Table 1.

Comparative Example 8

Except for using, instead of 1-methylimidazole 5 parts, 2-mercapto benzoimidazole (Nocrac MB, made by Ouchi Shinko Chemical Industrial Co., Ltd.) 5 parts, the same procedure was followed as in Example 2 to obtain a polyether rubber composition and cross-linked rubber and the same procedure was followed to evaluate the various types of physical properties. The results are shown in Table 1.

TABLE 1

|  |  | Example | | | | | | | Comparative Example | |
|---|---|---|---|---|---|---|---|---|---|---|
|  |  | 1 | 2 | 3 | 4 | 5 | 6 | 7 | 1 | 2 |
| Formulation of polyether rubber composition | | | | | | | | | | |
| Polyether rubber | (parts) | 100 | 100 | 100 | 100 | 100 | 100 | 100 | 100 | 100 |
| 1-methylimidazole | (parts) | 1 | 5 | 10 | 5 | 10 | 5 | 10 |  |  |
| 2-mercapto benzoimidazole | (parts) | | | | | | | | | |
| Cross-linking agent | | | | | | | | | | |
| Sulfur | (parts) | 0.5 | 0.5 | | | | | | 0.5 | |
| 4,4'-dithiodimorpholine | (parts) | | | 0.5 | | | | | | 0.5 |
| 6-methylquinoxaline-2,3-dithiocarbonate | (parts) | | | | 1.4 | 1.4 | | | | |
| 2,4,6-trimercapto-1,3,5-triazine | (parts) | | | | | | 0.9 | 0.9 | | |
| Cross-linking accelerator | | | | | | | | | | |
| Tetraethylthiuram disulfide | (parts) | 1 | 1 | 1.5 | | | | | 1 | 1.5 |
| Dibenzothiazyl disulfide | (parts) | | | 1.5 | | | | | | 1.5 |
| Pentaerythritol | (parts) | | | | 0.7 | 0.7 | | | | |
| Cross-linking acceleration aid | | | | | | | | | | |
| Zinc white | (parts) | 5 | 5 | 5 | | | | | 5 | 5 |
| Stearic acid | (parts) | 1 | 1 | 1 | 1 | 1 | 1 | 1 | 1 | 1 |
| Acid acceptor | | | | | | | | | | |
| Hydrated lime | (parts) | | | | 4 | 4 | | | | |
| Calcium carbonate | (parts) | | | | 5 | 5 | 5 | 5 | | |
| Magnesium oxide | (parts) | | | | | | 3 | 3 | | |
| Filler | | | | | | | | | | |
| Carbon black | (parts) | 10 | 10 | 10 | 10 | 10 | 10 | 10 | 10 | 10 |
| Cross-linking temperature | (° C.) | 170 | 170 | 180 | 160 | 160 | 160 | 160 | 170 | 180 |
| Onium ion unit content ratio | (モル%) | 0.7 | 3.5 | 6.8 | 3.4 | 6.4 | 3.3 | 6.4 | — | — |
| Evaluation of physical properties | | | | | | | | | | |
| log$_{10}$ (volume resistivity value) | | 7.27 | 6.57 | 6.05 | 6.35 | 5.77 | 6.73 | 6.00 | 7.73 | 7.23 |
| Increase value in volume resistivity value caused by electric current | | 0.33 | 0.22 | 0.15 | 0.29 | 0.12 | 0.26 | 0.18 | 0.56 | 0.52 |
| Compression set | (%) | 14 | 4 | 5 | 7 | 11 | 3 | 4 | 24 | 41 |

|  |  | Comparative Example | | | | | |
|---|---|---|---|---|---|---|---|
|  |  | 3 | 4 | 5 | 6 | 7 | 8 |
| Formulation of polyether rubber composition | | | | | | | |
| Polyether rubber | (parts) | 100 | 100 | 100 | 100 | 100 | 100 |
| 1-methylimidazole | (parts) | | | 1 | 5 | | |
| 2-mercapto benzoimidazole | (parts) | | | | | 1 | 5 |
| Cross-linking agent | | | | | | | |
| Sulfur | (parts) | | | | | 0.5 | 0.5 |
| 4,4'-dithiodimorpholine | (parts) | | | | | | |
| 6-methylquinoxaline-2,3-dithiocarbonate | (parts) | 1.4 | | | | | |
| 2,4,6-trimercapto-1,3,5-triazine | (parts) | | 0.9 | | | | |
| Cross-linking accelerator | | | | | | | |
| Tetraethylthiuram disulfide | (parts) | | | | | 1 | 1 |
| Dibenzothiazyl disulfide | (parts) | | | | | | |
| Pentaerythritol | (parts) | 0.7 | | | | | |
| Cross-linking acceleration aid | | | | | | | |
| Zinc white | (parts) | | | | | 5 | 5 |
| Stearic acid | (parts) | 1 | 1 | 1 | 1 | 1 | 1 |
| Acid acceptor | | | | | | | |
| Hydrated lime | (parts) | 4 | | | | | |
| Calcium carbonate | (parts) | 5 | 5 | | | | |
| Magnesium oxide | (parts) | | 3 | | | | |
| Filler | | | | | | | |
| Carbon black | (parts) | 10 | 10 | 10 | 10 | 10 | 10 |
| Cross-linking temperature | (° C.) | 160 | 160 | 170 | 170 | 170 | 170 |
| Onium ion unit content ratio | (モル%) | — | — | — | — | — | — |

TABLE 1-continued

| Evaluation of physical properties | | | | | | | |
|---|---|---|---|---|---|---|---|
| log$_{10}$ (volume resistivity value) | | 8.44 | 8.11 | Could not measured | Could not measured | 7.70 | 7.90 |
| Increase value in volume resistivity value caused by electric current | | 0.14 | 0.30 | | | 0.48 | 0.27 |
| Compression set | (%) | 26 | 8 | | | 24 | 20 |

From Table 1, the result is that the cross-linked rubber which is obtained by reacting, at 130 to 200° C., a polyether rubber composition comprised of polyether rubber in which the nitrogen atom-containing aromatic heterocyclic type compound and cross-linking agent which are predetermined in the present invention are blended in each case is low in volume resistivity value, suppressed increase in volume resistivity value by energization, and further is small in compression set rate (Examples 1 to 7).

On the other hand, the result is that when not blending the nitrogen atom-containing aromatic heterocyclic type compound which is determined by the present invention in the polyether rubber composition, the obtained cross-linked rubber in each case becomes higher in the volume resistivity value and/or the increase in volume resistivity value caused by electric current (Comparative Examples 1 to 4).

Further, when not blending a cross-linking agent in the polyether rubber composition, the cross-linking reaction did not proceed and a cross-linked product enabling evaluation of various types of physical properties could not be obtained (Comparative Examples 5 and 6).

Furthermore, when using the condensed heterocyclic type compound of 2-mercapto benzoimidazole instead of the nitrogen atom-containing aromatic heterocyclic type compound predetermined in the present invention, the obtained cross-linked rubber in each case became higher in volume resistivity value and, further, larger in compression set rate (Comparative Examples 7 and 8).

The invention claimed is:

1. A method of producing a cross-linked rubber, the method comprising:
    heating a polyether rubber composition at 130 to 200° C. to produce the cross-linked rubber, the polyether rubber composition comprising:
        100 parts by weight of polyether rubber which contains epihalohydrin monomer units,
        0.1 to 100 parts by weight of an aromatic heterocyclic compound containing a five-membered or six-membered nitrogen atom-containing ring, and
        0.1 to 10 parts by weight of at least one cross-linking agent selected from sulfur, sulfur-containing compounds, and triazine-based compounds.

2. The method of claim 1, further comprising kneading together said polyether rubber, said nitrogen atom-containing aromatic heterocyclic type compound, and said at least one cross-linking agent at 0 to 100° C. to produce the polyether rubber composition.

3. The method of claim 1, wherein said polyether rubber further contains unsaturated oxide monomer units.

4. The method of claim 1, wherein the aromatic heterocyclic compound is 1-methylimidazole.

5. The method of claim 1, wherein heating the polyether rubber composition at 130 to 200° C. causes the cross-linking of said polyether rubber to proceed simultaneously with a reaction that bonds said nitrogen atom-containing aromatic heterocyclic type compound to side chains of said polyether rubber in a cationized state.

6. A cross-linked rubber obtained by the method of claim 1.

7. An electroconductive member, comprising the cross-linked rubber as set forth in claim 6.

8. The method of claim 1, wherein the polyether rubber contains 0.1 to 100 mol % of the epihalohydrin monomer units with respect to the total monomer units.

* * * * *